(12) United States Patent
Allam

(10) Patent No.: US 9,708,543 B2
(45) Date of Patent: Jul. 18, 2017

(54) PRODUCING HYDROCARBONS FROM CATALYTIC FISCHER-TROPSCH REACTOR

(71) Applicant: Rodney J. Allam, Wiltshire (GB)

(72) Inventor: Rodney J. Allam, Wiltshire (GB)

(73) Assignee: GTLpetrol LLC, Montclair, NJ (US)

( * ) Notice: Subject to any disclaimer, the term of this patent is extended or adjusted under 35 U.S.C. 154(b) by 0 days.

(21) Appl. No.: 14/251,122

(22) Filed: Apr. 11, 2014

(65) Prior Publication Data

US 2014/0308172 A1 Oct. 16, 2014

Related U.S. Application Data

(60) Provisional application No. 61/811,589, filed on Apr. 12, 2013.

(51) Int. Cl.
*C01B 3/00* (2006.01)
*C01B 3/02* (2006.01)
(Continued)

(52) U.S. Cl.
CPC ............... *C10G 2/34* (2013.01); *C01B 3/38* (2013.01); *C10K 3/06* (2013.01); *B01D 53/1475* (2013.01);
(Continued)

(58) Field of Classification Search
CPC .... C01B 3/00; C01B 3/02; C01B 3/32; C01B 3/34; C01B 3/38; C01B 2203/00; C01B 2203/02–2203/0261; C01B 2203/04; C01B 2203/042–2203/043; C01B 2203/0465–2203/0475; C01B 2203/0495; C01B 2203/06; C01B 2203/062; C01B 2203/08; C01B 2203/0872; C01B 2203/0888; C01B 2203/0895; C01B 2203/12–2203/1211; C01B 2203/1235; C01B 2203/1241; C01B 2203/1288; C01B 2203/1294; C01B 2203/14; C01B 2203/142; C01B 2203/148; C01B 2203/80; C01B 2203/84; C10G 2/00; C10G 2/30;
(Continued)

(56) References Cited

U.S. PATENT DOCUMENTS 6,596,780 B2 * 7/2003 Jahnke et al. ............ 518/700
6,669,744 B2 * 12/2003 Allam et al. ............ 48/127.9
(Continued)

FOREIGN PATENT DOCUMENTS

JP 09-208974 8/1997
JP 2008-247717 10/2008
(Continued)

OTHER PUBLICATIONS

International Search Report and Written Opinion issued in PCT Application No. PCT/US2014/033818 on Aug. 29, 2014, 12 pages.
(Continued)

*Primary Examiner* — Natasha Young
(74) *Attorney, Agent, or Firm* — Fish & Richardson P.C.

(57) ABSTRACT

An integrated plant for the conversion of a hydrocarbon gas such as natural gas to useful hydrocarbon liquid fuels and feed-stocks comprises an H2+CO syn-gas generation system which provides feed gas to a Fischer-Tropsch catalytic hydrocarbon synthesis system with an associated power and heat energy system.

12 Claims, 2 Drawing Sheets

(51) Int. Cl.
*C01B 3/32* (2006.01)
*C01B 3/34* (2006.01)
*C01B 3/38* (2006.01)
*C10G 2/00* (2006.01)
*C10K 3/00* (2006.01)
*C10K 3/02* (2006.01)
*C10K 3/04* (2006.01)
*C10K 3/06* (2006.01)
*B01D 53/00* (2006.01)
*B01D 53/14* (2006.01)

(52) U.S. Cl.
CPC *C01B 2203/025* (2013.01); *C01B 2203/0233* (2013.01); *C01B 2203/0244* (2013.01); *C01B 2203/043* (2013.01); *C01B 2203/047* (2013.01); *C01B 2203/0475* (2013.01); *C01B 2203/0495* (2013.01); *C01B 2203/062* (2013.01); *C01B 2203/0894* (2013.01); *C01B 2203/1241* (2013.01); *C01B 2203/1294* (2013.01); *C01B 2203/142* (2013.01); *C01B 2203/148* (2013.01); *C01B 2203/84* (2013.01); *C10G 2300/4043* (2013.01); *Y02P 20/152* (2015.11)

(58) Field of Classification Search
CPC ........ C10G 2/32; C10G 2/34; C10G 2300/40; C10G 2300/4043; C10K 3/00–3/06; B01D 53/14; B01D 53/1456; B01D 53/1475
See application file for complete search history.

(56) References Cited

U.S. PATENT DOCUMENTS

| | | | |
|---|---|---|---|
| 2003/0083391 | A1 | 5/2003 | Jahnke et al. |
| 2003/0119919 | A1 | 6/2003 | Allam et al. |
| 2003/0236312 | A1 | 12/2003 | O'Rear |
| 2004/0220443 | A1 | 11/2004 | De Graff et al. |
| 2010/0263385 | A1* | 10/2010 | Allam ............ C01B 3/36 60/780 |
| 2011/0306682 | A1* | 12/2011 | Tasaka ............ 518/700 |

FOREIGN PATENT DOCUMENTS

| | | |
|---|---|---|
| JP | 2011-152498 | 8/2011 |
| WO | 96-01228 | 1/1996 |

OTHER PUBLICATIONS

Office Action issued in Russian Application No. 2015148344 on Jan. 22, 2016; 4 pages.

International Preliminary Report on Patentability issued in PCT Application No. PCT/US2014/033818 on Oct. 13, 2015, 8 pages.

European Search Report issued in EP Application No. 14782494.0 on Dec. 12, 2016, 4 pages.

Communication pursuant to Article 94(3) EPC issued in EP Application No. 14782494.0 on Jan. 27, 2017, 6 pages.

* cited by examiner

PRODUCING HYDROCARBONS FROM CATALYTIC FISCHER-TROPSCH REACTOR

CLAIM OF PRIORITY

This application claims benefit of U.S. Provisional Patent Application No. 61/811,589, entitled "Production of Hydrocarbons from a Catalytic Fischer-Tropsch Reactor System, filed on Apr. 12, 2013, the contents of which are incorporated herein by reference in its entirety for all purposes.

TECHNICAL FIELD

This implementation relates to producing hydrocarbons from a catalytic Fischer-Tropsch reactor.

BACKGROUND

Natural gas may be found in remote locations both on- and offshore. It is generally expensive and impractical to transport natural gas from its source to a distant processing plant. One solution is to convert the gas on-site to a valuable and easily transportable product. In this way, the value of the natural gas may be increased.

Natural gas may be converted to "synthesis gas" which is a mixture of carbon monoxide and hydrogen. Synthesis gas may be converted to a solid or liquid synthetic fuel or "synfuel". The synfuel has less volume per unit mass (i.e. has a greater density) than the natural gas. Accordingly, it is more economical to transport synfuel than a corresponding amount of natural gas.

One disadvantage of the onsite processing of natural gas is that the space available for the processing apparatus is often limited. For example, in situations where the source of natural gas is offshore, a gas rig or a sea vessel is used to support the apparatus for extracting the natural gas. The processing apparatus required to convert natural gas into synfuel must be as compact and as lightweight as possible without sacrificing efficiency, productivity or cost-effectiveness. A further disadvantage is that the remote locations of the processing plants require that the plants are as self-sufficient as possible in the production of power to drive associated apparatus.

SUMMARY

An integrated plant for the conversion of a hydrocarbon gas such as natural gas to useful hydrocarbon liquid fuels and feed-stocks comprises an $H_2+CO$ syn-gas generation system which provides feed gas to a Fischer-Tropsch catalytic hydrocarbon synthesis system with an associated power and heat energy system.

High efficiency, low capital cost, together with a low carbon footprint, are the major objectives of a total facility. U.S. Pat. Nos. 6,534,551 and 6,669,744 describe an integrated synthesis gas generation system comprising a two-stage synthesis gas generation unit integrated with a gas turbine which provides at least part of the energy required to drive an $O_2$ production plant. The $O_2$ plant can be either a cryogenic air separation unit, a high temperature mixed oxide $O_2$ ion transfer membrane reactor integrated with the gas turbine, or other unit. The two stage synthesis gas generator comprises a Partial Oxidation (POX) or an Autothermal Reformer (ATR) coupled in either case in a parallel or series configuration with a gas heated catalytic steam/hydrocarbon reformer (GHR) in which the heating gas is the mixed product from each synthesis gas generation reactor. The hot exhaust gas from the gas turbine provides at least part of the heat used to preheat the feed streams to the synthesis gas generation reactors.

The FT hydrocarbon synthesis reactor can comprise either a single stage or multi stage system with cooling and separation between stages of aqueous and hydrocarbon liquid phase from un-reacted synthesis gas and inert components in the gas phase. The first stage separated gas stream is heated and used as feed to the second stage FT reactor. This procedure is repeated for subsequent stages.

The development testing and commercial scale demonstration of a $CO_2$ tolerant catalyst for use in an FT hydrocarbon synthesis gas system using fixed bed catalyst in tube reactors is described in the Journal of Natural Gas Chemistry 13 (2004) 1-9. The article is titled 'Development of a $CO_2$ Tolerant Fischer-Tropsch Catalyst: From Laboratory to Commercial Scale demonstration in Alaska by J. H. M. Font-Freide, T. D. Gamlin, J. R. Hensman, B. Ney and C. Sharp. This paper defines the design parameters which may achieved in each stage of a multi-stage fixed bed FT reactor system to achieve optimum or otherwise increased performance. The characteristics identified in this paper define the range of operating parameters used for the operation of an FT reactor to achieve the best or increased conversion rate of $CO+H_2$ to hydrocarbons having the most or more valuable composition which means the maximum or increased production of hydrocarbons having a carbon number of greater than 5 (e.g., greater than 12). The paper describes catalyst formulation with the results of performance using $H_2+CO$ syn-gas containing $CO_2$ and inert $N_2$. Catalyst formulations described in this paper used cobalt as the active component deposited on a variety of bases such as zinc oxide, silica gel and alumina and all these showed tolerance to $CO_2$ content of up to about 18% to 19% with hardly any effect on CO conversion to hydrocarbons and selectivity to $C_5$+hydrocarbons. The zinc oxide on alumina catalyst was chosen as being attractive and developed to the point of demonstration in a pilot plant producing about 300 bbl/day equivalent synthetic crude oil product which was operated at Nikiski in Alaska. This catalyst has a claimed life of 4 years based on recommended operating conditions. These are $CO_2$ content of up to 18% of the total ($H_2+CO+CO_2$), $H_2$ to CO ratio of greater than 1.5 such as in the range 1.8 to 2 to substantially maintain conversion, and a throughput of below 2500 normal liters ($H_2+CO$) per hour per liter of catalyst to avoid excessive methane production. FT catalysts in general include a series of in situ regenerations to achieve a reasonable 4 year catalyst life which leads in the case of the defined zinc oxide catalyst to a commercial objective of greater than 70% conversion of CO per pass with a C5+productivity of greater than 150 gm/(Liter·hr) and a $C_5$+selectivity of greater than 80%.

The operation of an integrated syn-gas generation system typically copes with two fundamental problems. Firstly, the FT reaction takes place at recommended $H_2$ to CO ratios in the range of 1.5 to 2. The overall mass balance depends on the overall selectivity for conversion of the CO to methane, $C_2$ to $C_4$ hydrocarbons and $C_5$+hydrocarbons which includes a $H_2$ to CO ratio in the range 2.1 to 2.3. This means that the ratio of $H_2$ to CO in the unconverted $H_2+CO$ leaving an FT reactor stage may be below the operating ratio for inlet to the next FT reactor stage. It is common practice for there to be provision in the syn-gas supply system for the supply of $H_2$ at a relatively high concentration to re-establish the $H_2$ to CO ratio for the inlet gas stream to the next reactor stage. This separate $H_2$ stream may also be provided for the subsequent wax hydro-cracking reactor with produces the operating middle distillate fractions from the high molecular weight waxes which are the major products from the FT reactor using low temperature cobalt based catalysts. Secondly, the operation of a multistage FT reactor, following liquid water and liquid hydrocarbon separation, produces a final off-gas gas stream comprising unconverted $H_2+CO$, together with $CO_2$ and inert $N_2+A$ from the natural gas and oxygen feed to the syn-gas generation system, plus separated $C_1$ to $C_4$ hydrocarbons produced in the FT reaction. There is a large build up in the concentration of total inert components, particularly $CH_4$, present with the unconverted $H_2+CO$ which increases with each reactor stage. The reaction conditions defined includes a partial pressure of $H_2+CO$ of near 30 bar. The pressure drop through the FT reactor plus the large build-up of inert $C_1$ to $C_4$ hydrocarbons in the reactor may cause a very large drop in the partial pressure of the $H_2+CO$ entering the next stage of the reactor in spite of the addition of fresh $H_2$ to re-establish the design $H_2$ to CO ratio. This drop may led to the common practice of compressing the feed gas to the next FT reaction stage to re-establish the near 30 bar partial pressure of $H_2+CO$. The compression may not reduce the concentration of inert components, particularly CO2 and CH4, which build up in concentration from stage to stage in the FT system. It simply re-establishes the partial pressure of the H2+CO. The inevitable build-up of an increasing concentration of inert components in a multi-stage FT reactor system means that the concentration of $H_2+CO$ in the inlet gas decreases significantly in the second and third FT reactor stages in spite of the use of a recompression to maintain a reasonable $H_2+CO$ partial pressure. The catalyst operating at a typical temperature of 220° C. has its pores filled with hydrocarbon liquid through which the $H_2$ plus CO may diffuse the reach the active catalyst surface sites for conversion to hydrocarbon products. The presence of inert components together with the conversion of the $H_2+CO$ to hydrocarbon products which may then diffuse back through the liquid filled pores sets up a counter-diffusion resistance to the diffusion of the $H_2+CO$ inlet stream which reduces the productivity of the catalyst. This means that if the concentration of inert $N_2+A$ or the C1 to C4 hydrocarbons, particularly the methane or the $CO_2$ can be reduced in some way then the productivity of a given quantity of catalyst will be increased. This favours a strategy to consider which of the inert components could be removed. Considering separation processes available, the removal of $CO_2$ is possible using existing technology in a cost effective manner. The much higher diffusion rate of $H_2$ compared to CO through the hydrocarbon liquid which fills the pores means that there may tend to be a much higher concentration of $H_2$ at the active catalyst sites than in the bulk gas feed stream. A high $H_2$ concentration at the catalyst active sites means a higher ratio of $H_2$ to CO which would seem to favour increased rates of conversion of CO but it also leads to a greater tendency for hydrocarbon chain termination by reaction of terminal —$CH_2$— groups with hydrogen atoms. This leads to the requirement for a lower $H_2$ to CO ratio in the FT reactor feed than the ratio for stoichiometric conversion of $H_2+CO$ to the spectrum of hydrocarbon products in order to limit the ratio at the reaction sites for optimum or improved selectivity to $C_5$+hydrocarbons and particularly for the maximisation or increase of $C_{12}$+hydrocarbons.

It is the objective of this implementation to provide a syn-gas feed to an FT reactor system which is integrated with the FT reactor system to maximise or otherwise increase the conversion of $H_2+CO$ syn-gas to hydrocarbons having a carbon number of 5 or more and more importantly a carbon number of 12 or more. Specifically it is the objective of this implementation to define the best integration between a syn-gas generation system described in U.S. Pat. Nos. 6,534,551 and 6,669,744 with an FT reactor system to both maximise or otherwise increase the conversion of $H_2+CO$ syn-gas to hydrocarbons having carbon numbers greater than 5 such as greater than 12 and also to facilitate the recovery of the valuable fuel and syn-gas components in the separated off-gas leaving the FT final reactor stage. The objective is accomplished by defining the design requirements for an optimum or enhanced integration of a syn-gas generation system and an FT reactor system using fixed bed multi-stage reactors designed to produce hydrocarbon products with a carbon number of 5 or higher such as 12 or higher to maximise or otherwise increase the value of hydrocarbon yield following hydro-cracking to generate middle distillate products.

Provide a total synthesis gas feed to the FT reactor system with a $H_2$ to CO ratio in the range 2.1 to 2.3 which satisfies the overall $H_2$ to CO ratio required for the final hydrocarbon conversion products produced by the FT reaction.

Provide the total feed of syn-gas to the FT system with an optimum or enhanced partial pressure of hydrogen plus carbon monoxide to maximise or otherwise increase conversion of synthesis gas to total hydrocarbon products in the overall FT system Operate each of the FT reactor stages with a partial pressure of the $H_2+CO$ in the range 15 bar to 40 bar such as in the range 20 bar to 30 bar.

Provide a synthesis gas feed to each of the FT reactor stages which has a hydrogen to carbon monoxide ratio which is optimum for the maximisation or increase of conversion of CO to hydrocarbons having a carbon number of 5 or more and preferably maximising or otherwise increasing the yield of hydrocarbons with a carbon number of 12 or more.

Provide a pure H2 make-up gas stream by taking a portion of the total syn-gas feed to the FT system following cooling to near ambient temperature and condensed water separation and passing it through a multi-bed pressure swing adsorption unit to separate sufficient $H_2$ to be added to the separated gas stream leaving the FT stages to increase the $H_2$ to CO ratio to the optimum value for conversion of $H_2+CO$ syn-gas to hydrocarbon products in the next reactor stage. In addition to this $H_2$ demand, provide additional $H_2$ for fresh feed to the hydro-treating reactors used for breaking down the high molecular weight waxes to middle distillate products.

Provide a feed stream of $H_2+CO$ syn-gas to each of the FT reactor stages with a $H_2$ to CO ratio of between 1.5 and 2 such as between 1.7 and 1.9

Compress the waste gas from the PSA to FT feed gas pressure and add this stream to the total FT feed gas to eliminate or otherwise decrease any loss of $H_2+CO$ syn-gas.

Provide a synthesis gas feed to each of the FT stages with a molar percentage of carbon dioxide below 20% and preferably below 18% of the total ($H_2+CO+CO_2$) to maximise or otherwise increase the yield and quantity of the hydrocarbon products with carbon numbers of 5 or more such as 12 or more.

Operate each stage of the FT reactor system as near as possible to its optimum or enhanced conditions for achieving maximum or otherwise increased catalyst productivity and selectivity.

Compress the feed gas if necessary before it enters the next FT stage to ensure that the partial pressure of $H_2+CO$ is within the optimum or enhanced pressure range.

Provide a chemical or physical solvent $CO_2$ removal system which removes $CO_2$ from the discharge separated gas stream leaving the first stage FT reactor leaving sufficient $CO_2$ in the inlet gas stream to the last FT reactor to keep its molar percentage of the combined $(H_2+CO+CO_2)$ stream below 18%. This $CO_2$ removal has the effect of not only maintaining a low $CO_2$ to $(H_2+CO+CO_2)$ ratio but also keeping the partial pressure of $H_2+CO$ high in the second stage reactor without the need or otherwise reduce the need for feed-gas compression. As an illustration see the overall mass balance given in table 1. Consider a first stage FT reactor with a $H_2+CO$ feed having an $H_2$ to CO ratio of 1.8 and with 15% $CO_2$. The FT reaction based on 60% CO conversion to FT reaction products in each stage with an overall requirement of $H_2$ to CO ratio of 2.25 produces a $C_5$+FT product plus $C_1$ to $C_4$ products which are substantially equivalent to 20% of the CO converted in the FT reaction expressed in this example as $CH_4$. $CO_2$ is removed from the separated outlet gas from the first stage FT reactor. The separated outlet gas from the second reactor after H2 addition to bring the H2 to CO ratio up to 1.8 is compressed to 57 bar. This pressure is high enough to overcome pressure drop in the third FT reactor stage plus product separation and leave a sufficiently high pressure to recycle part of this streamback to the syn-gas production system. The overall mass balance of the three stage FT reactor system with units of Kg mols/hr is:

TABLE 1

|  | 1$^{st}$ STAGE FEED IN | 1$^{st}$ STAGE GAS OUT | 2$^{nd}$ STAGE FEED IN | 2$^{nd}$ STAGE GAS OUT | 3$^{rd}$ STAGE FEED IN | 3$^{rd}$ STAGE GAS OUT |
|---|---|---|---|---|---|---|
| $H_2$ | 1800 | 450 | 720 | 180 | 288 | 72 |
| CO | 1000 | 400 | 400 | 160 | 160 | 64 |
| $CO_2$ | 494 | 494 | 79 | 79 | 79 | 79 |
| $CH_4$ | 77 | 197 | 197 | 245 | 245 | 264 |
| $N_2$ + A | 69 | 69 | 69 | 69 | 69 | 69 |
| Pressure | 35 bar | 33 bar | 33 bar | 31 bar | 54 bar | 52 bar |
| $H_2$ + CO Partial Pressure | 29.07 bar | 19.1 bar | 26.48 bar | 15.87 bar | 31.33 bar | 12.9 bar |

Overall CO Conversion to Hydrocarbons 93.6%

Note that minor composition changes due to solubility of gaseous components in produced liquids plus the small production of $CO_2$ in the FT reactors has been neglected.

The important primary effect of introducing a $CO_2$ removal step on the 1$^{st}$ stage gas outlet is to significantly reduce the burden of inert $CH_4+CO_2$ in the feeds to stages 2 and 3 which increases the catalyst productivity by reducing the counter-diffusion resistance of inerts present in the liquid filled catalyst pores. Secondary advantages are that the partial pressure of $CO_2$ is high at this point while the flow is only 48.7% of the dry feed gas flow. The removal of $CO_2$ results in a high enough partial pressure of $H_2+CO$ being available in the second stage to avoid the need for compression. The total third stage inlet gas is compressed to a pressure of 54 bar resulting in the partial pressure of $H_2+CO$ in the third stage inlet being satisfactory while the unconverted outlet gas stream from the third stage containing unconverted $H_2+CO$ plus $C_1$ to $C_4$ hydrocarbon fuel gas plus $CO_2$ plus inert $N_2+A$. can be recycled back to the syn-gas production system at 52 bar with no or reduced further compression used.

The separated fuel gas leaving the last FT reactor stage may be recycled back to the syn-gas generation system and the gas turbine. The quantity of fuel gas recycled back to the gas turbine fuel system and/or the gas turbine exhaust fired heater fuel system should be such that the inert $N_2+A$ does not build up to a concentration in the total syn-gas feed to the FT system following cooling and liquid water separation of more than 5% molar and preferably not more than 3%.

It is the objective of this implementation to produce an optimum or enhanced integration between a $H_2+CO$ syn-gas generation system, designed in accordance with U.S. Pat. Nos. 6,534,551 and 6,669,744, and a fixed catalyst bed Fischer-Tropsch reactor system which uses a cobalt based catalyst. It is the objective of this implementation to maximise or otherwise increase the yield of $C_5^+$ hydrocarbons and more particularly maximise the yield of $C_{12}^+$ hydrocarbons which form the basis for the production of middle distillates such as diesel and jet fuel. It is the objective of this implementation to allow each stage of a multi-stage FT reactor sequence to receive the optimum or enhanced $H_2+CO$ feed gas mixture at the optimum or enhanced $H_2+CO$ composition partial pressure and $CO_2$ content. It is the objective of this implementation to produce a $H_2+CO$ syn-gas feed to the FT system which satisfies the overall $H_2$ to CO ratio in the total FT hydrocarbon products and the effluent gas stream produced in the FT system. This ratio will be significantly different from the ratio required for optimum or enhanced performance of each stage of the FT reactor system.

It is the objective of this implementation to operate the final stage of the FT reactor system so that the unconverted off-gas which also contains the bulk of the $C_1$ to $C_4$ hydrocarbons can be processed, so that no or reduced further gas compression is used to deliver recycle hydrocarbon rich gas to the syn-gas generation system and the gas turbine.

It is the objective of this implementation to control the $CO_2$ concentration in the feeds to each of the FT reactor stages so that they are below a level which would affect the FT reactions.

It is the objective of this implementation that the $N_2+A$ inert components derived from the natural gas and oxygen feed streams to the syn-gas generation system may be removed from the recycle FT off-gas system by utilising a portion of this off-gas as gas turbine fuel.

It is the objective of this implementation to produce a total excess $CO_2$ stream, over and above that are used for conversion of a natural gas feed stream to refined hydrocarbon liquid products using the FT and hydro-treating systems, as a substantially pure $CO_2$ product stream for disposal or use for enhanced oil recovery to minimise or otherwise reduce the carbon footprint of the overall system.

The details of one or more embodiments of the implementation are set forth in the accompanying drawings and the description below. Other features, objects, and advantages of the implementation will be apparent from the description and drawings, and from the claims.

DETAILED DESCRIPTION

Figure 1A:
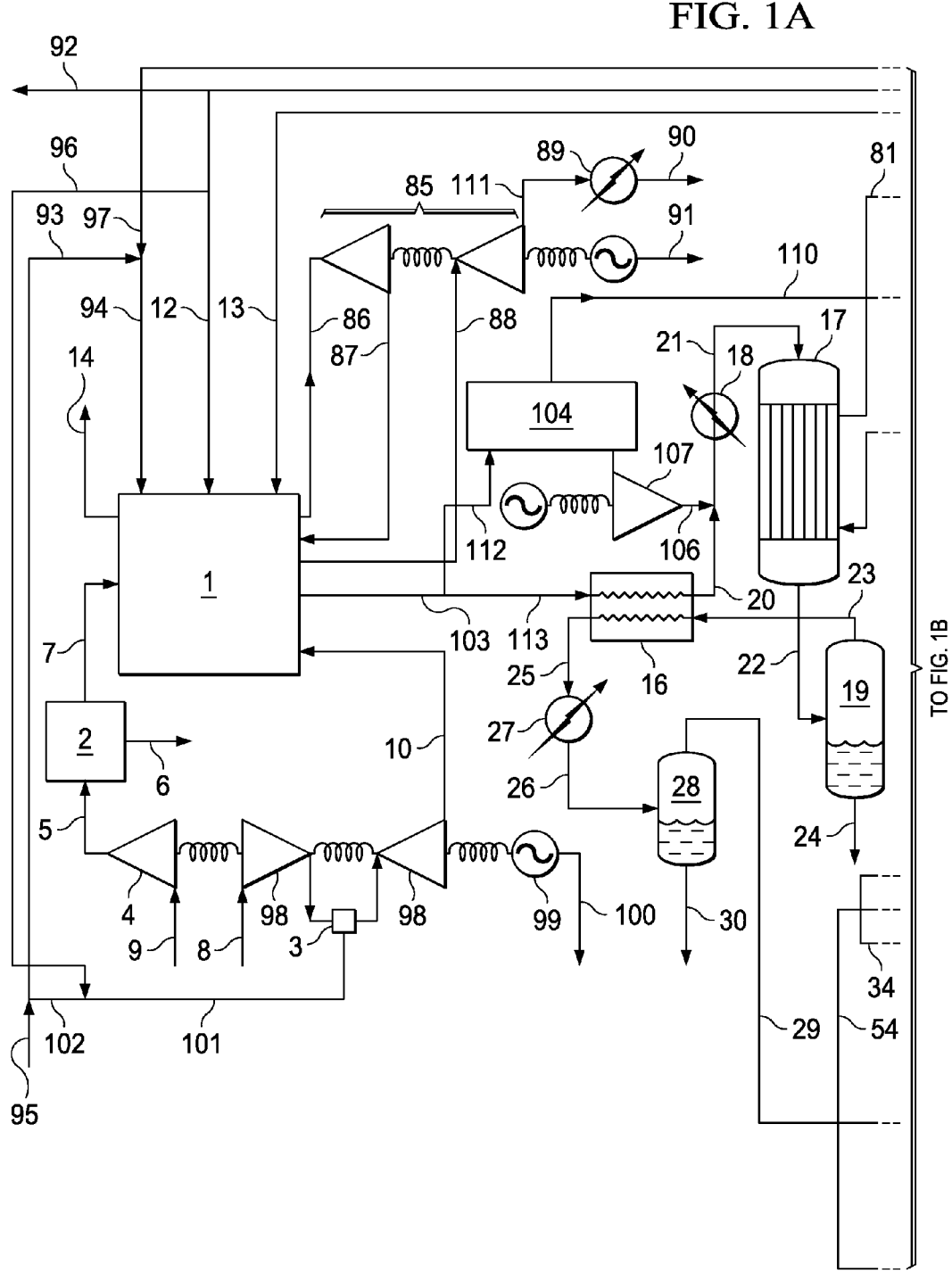
FIGS. 1A and 1B are a flow-sheet showing the integration of a syn-gas generation system and a three stage FT hydrocarbon synthesis system.

The overall conversion of a feed gas containing $CO+H_2$ to hydrocarbon products in a fixed reactor system using a cobalt catalyst requires a $H_2$ to CO ratio generally in the range 2.1 to 2.35 for overall mass balance. The optimum $H_2$ to CO ratio for best conversion of syn-gas to hydrocarbon products with carbon numbers of 5 or more or more importantly 12 or more requires a much lower hydrogen to CO ratio. This is due to the fact that at the FT reaction temperature of about 200° C. the liquid hydrocarbons produced in the FT reactors fill the micro pore channels in the catalyst pellets. This means that the $H_2+CO$ reactants may diffuse through a layer of liquid before they reach the catalyst surface while the inert components $(N_2+A+CH_4+C_2H_6)$ together with unconverted $H_2+CO$ must diffuse back to the bulk gas stream. The diffusion rate in the liquid of hydrogen is significantly higher than that of the other components. If the inlet gas $H_2$ to CO ratio to each FT reactor stage was the same as the overall ratio used for the conversion process (2.1 to 2.35) then the ratio at the catalyst surface may be much higher. This would lead to hydrocarbon a greater tendency for chain termination to occur which would reduce the yield particularly of the $C_{12}+$hydrocarbons. The recommendation in the paper by Joep Font-Friede et al using the developed and tested B.P. catalyst is to use a $H_2$ to CO ratio of greater than 1.5 and a space velocity of less than 2500 hr, a total conversion pressure of 30 bar for the published test data with $CO_2$ mol % of up to 18% and with a specific example at a ratio of 17% having a $CO+H_2$ partial pressure at this $CO_2$ content of 24.78 bar. The figures are based on a catalyst prepared using the technique described which has cobalt as the active component which is deposited on a zinc oxide carrier. The syn-gas fed to an FT reactor stage should have a $H_2$ to CO ratio in the range 1.5 to 2.0 and preferably in the range 1.7 to 1.9. The partial pressure of $H_2+CO$ should be near to 25 bar in the range 23 bar to 27 bar while the $CO_2$ mol fraction should be in below 18% and preferably below 15% molar. With a conversion of CO in a typical rector stage given as 60% it is necessary to use at least 2 and preferably 3 stages of FT reactor. Each stage has a total outlet product cooler which cools to a point above the temperature at which solid wax would deposit. There is then a separator producing a hydrocarbon liquid phase, an aqueous phase and an unconverted gas phase which becomes the feed to the second and third stage reactors or becomes the final FT vent gas for recycle to the syn-gas production reactors or to the gas turbine as fuel or to the gas turbine exhaust heater as fuel for supplementary firing.

In order to meet these operating conditions for optimum or enhanced FT reactor performance a syn-gas from the 2 stage syn-gas generation reactors defined by U.S. Pat. Nos. 6,534,551 and 6,669,744 with a $H_2$ to CO ratio of between 2.1 and 2.35 may be produced in order to satisfy the overall mass balance of the FT reactor system. $H_2$ may be removed from the total FT system feed syn-gas stream so that each FT reactor stage can operate with a $H_2$ to CO ratio in the range 1.5 to 2 such as in the range 1.7 to 1.9. To remove $H_2$, a portion of the syn-gas, following cooling to near ambient temperature and separation of condensed liquid water may be diverted from the main stream and passed through a multi-bed swing adsorption unit. The PSA may produce a substantially pure hydrogen product stream at near feed gas pressure and a waste gas stream at near atmospheric pressure. The waste gas stream, which contains all the CO and $CO_2$ present in the PSA feed may be compressed in a gas compressor to the pressure of the feed to the first FT reactor. No CO or $H_2$ may be lost in the $H_2$ PSA separation system.

The quantity of hydrogen separated in the $H_2$ PSA unit may be sufficient to make up the deficiency of $H_2$ in the unconverted gas off-take following the first and subsequent FT reactor stages. The conversion of $H_2+CO$ to FT hydrocarbon products use a $H_2$ to CO ratio of 2.1 to 2.35 so using an inlet ratio of 1.7 to 1.9 may result in an outlet ratio of $H_2$ to CO below 1.3 which may be increased to the range 1.7 to 1.9 by the addition of fresh hydrogen. The hydrogen make-up flow may be available at a pressure higher than the inlet pressure to the next reactor stage. In order to avoid having to compress the PSA $H_2$ product stream, it is convenient to generate the syn-gas at a higher pressure than is required for the inlet to the first stage FT reactor and reduce the pressure across a valve placed downstream of the PSA off-take. The pressure reduction may be sufficient to allow the $H_2$ product from the PSA to be higher than the outlet off-gas pressure following the FT first and second stage and subsequent reactors. In order to ensure that the $CO_2$ content of the feed gas to each stage of the FT reactor system is below 18% such as below 15% molar, a $CO_2$ removal system may be used to remove $CO_2$ from the syn-gas. The most convenient locations for selecting high $CO_2$ content gas streams for feeding an amine solvent $CO_2$ absorption system are firstly to treat the PSA off gas stream following compression in a first absorption column since all the $CO_2$ present in the PSA is concentrated in this stream. Secondly, the 60% conversion of $H_2+CO$ in the first stage FT reactor may have enriched the unconverted off-gas in $CO_2$ mol fraction and this stream prior to hydrogen make-up addition may be passed through a second amine $CO_2$ adsorption column. The combined amine solvent streams taken from the base of these two columns may be regenerated in a common flash and $CO_2$ stripping column to produce a pure $CO_2$ product stream. The low pressure steam used for the stripping column re-boiler may be produced in the fresh syn-gas cooling train following the waste heat boiler. The mol fraction of $CO_2$ in the dry syn-gas feed from the syn-gas generation system may depend on the steam to active carbon ratio used in the two stage syn-gas generation system and the quantity of $CO_2$ recycled to the syn-gas generation system. It will often be possible to select only a single position for $CO_2$ removal and this may, in general, be from the first stage reactor system outlet gas stream. A further feature of the use of a $CO_2$ removal system may be that specifically in the system described there is an excess $CO_2$ stream produced over and above that is required for operation of the syn-gas generation system as defined. The integration of the defined syn-gas generation system producing the used $H_2$ to CO ratio in the product syn-gas which may be fed to the FT system must have a means of rejecting the excess $CO_2$. Leaving this $CO_2$ in the final separated off-gas from the FT system is not an option since the heating value of this off-gas is much larger than the total heating value of the fuel used in the gas turbine and the fired heater so it is inevitable that a portion at the very least may be separated and separately vented otherwise the $CO_2$ may build up in the system because of the recycle used. The important feature is to make this inevitable need to remove a pure $CO_2$ stream from the system an advantage in the design of the FT system which may increase the catalyst productivity significantly and lead to lower numbers of catalyst filled tubes with corresponding reduction in the diameter and/or number of FT reactor vessels and hence the overall cost of the FT system. A further advantage is the minimisation or reduction of the overall carbon footprint of the integrated syn-gas and FT system. A further advantage is the production of a significant quantity of $CO_2$ which has a monetary value for enhanced oil production and when sequestered.

The optimum or enhanced operation of the FT reactor system may use a partial pressure of $H_2$+CO in the feed to each reactor stage to be in the range 20 bar to 40 bar such as in the range 25 to 30 bar. In a three stage reactor system the $H_2$+CO ratio for the first stage may be fixed at near 25 bar by selection of the feed syn-gas generation pressures allowing for pressure drop in the system. The partial pressure of $H_2$+CO in the feed to the second stage FT reactor may also be near 25 bar. There may be a build-up of inert $CH_4$ and $C_2$, $C_3$, $C_4$ hydrocarbons in the first stage FT off-gas. This may be balanced by the addition of pure hydrogen from the PSA to give $H_2$ to CO ratios in the range 1.7 to 1.9 together with the removal of the bulk of the $CO_2$ present at this point, leaving sufficient CO2 to keep the ratio of $CO_2$ to ($CO_2$+$H_2$+CO) in the 3rd stage feed of a three stage system below 18%. The feed to the third stage FT reactor now may have too little $H_2$+CO and too much $CH_4$, $C_2$, $C_3$ and $C_4$ hydrocarbon content so the third stage reactor feed may be compressed to a point where the $H_2$+CO partial pressure is at least 25 bar. This pressure may be near to the pressure used for recycle of off-gas from the third stage FT reactor back to the feed point to the syn-gas generation reactors. In practice the third stage FT reactor feed gas compressor may have a discharge pressure high enough to return a portion of the FT third stage off-gas to the feed point for the syn-gas generation system.

The fresh natural gas may have in general a small nitrogen content. The oxygen feed to the auto-thermal reformer or partial oxidation reactor may have a small content of argon and possibly also nitrogen. Since the off-gas from the final FT reactor stage may be recycled back to the syn-gas generation system, a portion of this off-gas may be added to the gas turbine fuel or added to fuel used in the gas turbine exhaust heater or to both. The quantity removed, burned and the combustion products vented to the atmosphere may be determined to substantially prevent the build-up of $N_2$+A in the feed to the FT system. The proportion of the FT final stage off-gas burned in the gas turbine and/or the fired heater may be sufficient to keep the content of $N_2$+A to below 5% such as below 2% molar (dry basis) in the total syn-gas feed to the FT system.

Figure 1B:
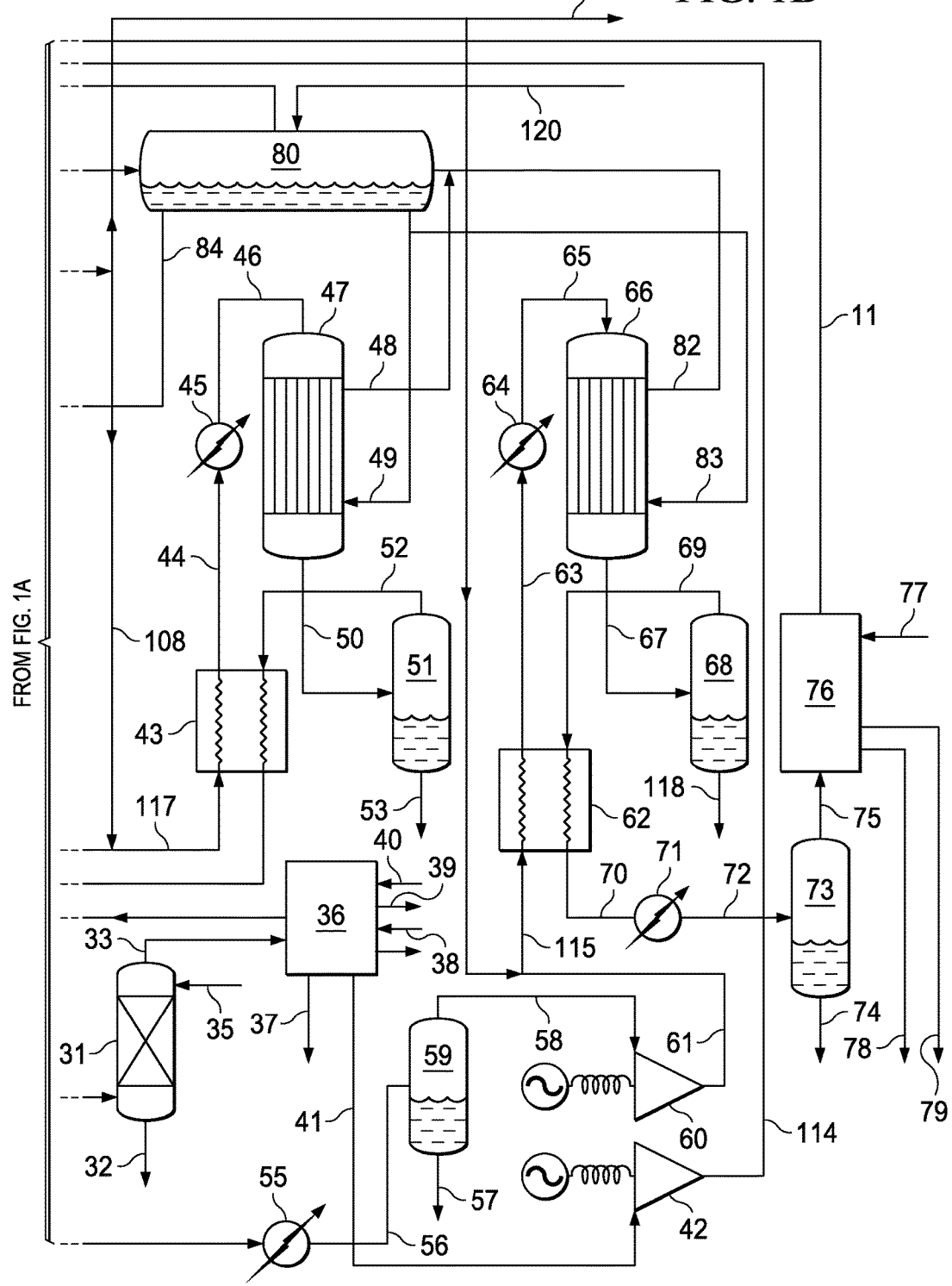

Note that if four or more FT reactor stages may be used it would be optional to remove the $CO_2$ from the second or higher stages of the separated off-gas. Note that although the examples given are based on a particular fixed bed reactor system using a particular catalyst the implementation can be applied to an FT system using slurry reactors or to any other type of reactor design in a multi-stage FT system FIG. 1 is a flow-sheet showing the integration of a syn-gas generation system (e.g., in accordance with U.S. Pat. Nos. 6,534,551 and 6,669,744) and a three stage FT hydrocarbon synthesis system designed in accordance with the present implementation. In some implementations, the syn gas generation system can be designed in accordance with U.S. Pat. Nos. 6,534,551 and 6,669,744, which is shown in FIG. 1 as Item 1. It comprises an auto-thermal reformer and a gas heated reformer in series operating to produce H2+CO synthesis gas with a common outlet pressure of 51 bar, with the total synthesis gas flow from both systems being used to heat the gas heated reformer to provide heat for the endothermic steam plus hydrocarbon reforming reactions taking place in the GHR catalyst filled tubes. The feed streams to item 1 comprise natural gas feed plus recycled fuel gas and CO2 from the FT system plus boiler feed-water which is used to produce reaction steam and high pressure superheated steam for power generation. The total synthesis gas product is cooled from a temperature of 600° C. leaving the shell side of the GHR to 330° C. leaving the waste heat boiler which generates near saturated steam at a pressure of 125 bar. The system includes a heat exchange train cooling the synthesis gas to near ambient temperature and a gas fired heater using the hot gas turbine exhaust as oxidant. These two heat exchangers are used for heating boiler feed-water for the production and superheating of the high pressure steam and superheating of the medium pressure steam generated in the FT reactors. These two heat exchange units also serve to provide pre-heating for the natural gas feed stream 93, the recycle fuel gas stream 97, the steam stream 87 and the recycle $CO_2$ stream 12. These streams are all heated to 550° C. in the combined heat exchange system which is part of item 1 before being used as the feed gases to the ATR plus GHR syn-gas generation reactors. The 125 bar near saturated steam is super-heated in these heat exchangers to 540° C. stream 86 and is expanded in steam turbine 85 to 54 bar producing an outlet stream 87 which is reheated to 550° C. as described.

The total steam stream 13 produced in the exothermic FT reactors at 15 bar pressure is preheated in the heat exchange system to 316° C. steam 88 and expanded in the steam turbine 85 low pressure stage. The exit steam 111 is condensed in an air cooled condenser 89 producing condensate stream 90 at 65° C. All of the above process steps are carried out in item 1. The 99.5% purity oxygen required for the auto-thermal reformer, stream 7 is provided at a pressure of 56 bar by a pumped liquid oxygen cycle cryogenic air separation plant 2 which discharges a waste nitrogen stream 6 to atmosphere. The air feed flow 5 at 5.6 bar is produced in compressor 4 with an atmospheric air feed stream 9. The air compressor is driven by a gas turbine 98 which has excess power output to drive an electric generator 99 producing an electric power output 100. The gas turbine has an atmospheric air feed 8 and a fuel gas inlet flow 101 to the gas turbine combustor 3 which is made up partly with fresh natural gas feed stream 102 and partly by a portion of the FT third stage separated outlet gas stream 96.

The syn-gas product stream 103 leaves the syn-gas generation system 1 after cooling and liquid water separation at a pressure of 35 bar and a temperature of 30° C. and with a $H_2$ to CO ratio of 2.25 to 1. A side stream 112 enters a multi bed pressure swing adsorption system 104 where it is separated into a pure $H_2$ stream 110 and a waste stream which is compressed from 1.2 bar to the feed gas syn-gas stream 20. At this point the total syn-gas stream has a $H_2$ to CO ratio of 1.8, the balance of the $H_2$ content in stream 103 is present as the pure $H_2$ stream 110. The main portion of the syn-gas stream 113 is heated first in a heat exchanger 16 against the outlet gas from the wax separator 19 stream 23 and then in the steam heater 18 to a temperature of 200° C., stream 2, which then enters the top of the first stage FT rector vessels 17. The FT reactors are composed of 25 mm ID tubes 6 meter to 10 meter long packed with cobalt on zinc oxide catalyst particles. The shell side is filled with water which boils at 15 bar pressure removing the exothermic heat generated in the FT reaction.

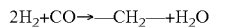   1.

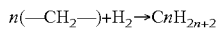   2.

In addition to the chain linking in reaction 2 there are other side reactions which produce small amounts of oxygenated hydrocarbons such as alcohols acids etc and also some unsaturated hydrocarbons. The unconverted gas plus high molecular weight hydrocarbon liquid which is at a temperature of about 220° C. leaves the bottom of each tube and exits the reactor in line 22 entering the wax liquid separator 19 and being separated as the liquid product stream 24. The unconverted gas stream 23 is cooled in heat exchanger 16 and ambient cooler 27 to 30° C. which condenses water and light naphtha which is separated in 28 producing a water plus naphtha product stream 30 and a gas stream 29. This stream 29 is scrubbed with a pure water stream 35 in a packed column 31 to remove soluble organic acids producing a contaminated water stream 32 which is sent to the foul water treatment system. The overheat stream 33 enters an MDEA $CO_2$ removal system 36 where $CO_2$ is removed producing an overhead product stream 34 which has a $CO_2$ content equivalent to a 15% molar fraction of the total ($H_2+CO+CO_2$) in the feed to the third FT stage reactor. The MDEA $CO_2$ removal system has a 6 bar steam heating stream 40 entering producing an exit condensate stream 39 plus cooling water inlet and outlet streams 38. The separated $CO_2$ stream 41 is compressed in 42 to 54 bar pressure. The discharge stream 114 is split into two parts. Stream 12 is recycled to the syn-gas production system while the net $CO_2$ product stream 92 is delivered by pipeline for geologic sequestration or used for enhanced oil recovery. Stream 34 has a $H_2$ to CO ratio of 1.125 and this ratio is increased to 1.8 by the addition of pure $H_2$ stream 108 producing the stream 117. This stream is heated against gas separated in the $2^{nd}$ stage liquid wax separator 51 in heat exchanger 43. The exit stream 44 is heated to 200° C. in the steam heater 45 before entering as stream 46 into the top of the second stage FT reactor vessels 47. The total gas plus liquid hydrocarbon stream leaving the bottom of the reactor 47 is stream 50 at 32 bar and 220° C. This stream enters the separator 51 where the liquid hydrocarbons stream 53 is removed. The separated gas stream 52 cools to 30° C. first in the economiser heat exchanger 43 leaving as stream 54 then in the ambient cooler 55 given an exit stream 56 at 30° C. This stream is separated in vessel 59 producing a water plus naphtha stream 57 and an overhead gas product stream 58 which is compressed in 60 to a pressure of 57 bar. This pressure is high enough to overcome the total pressure drop in the third stage FT reactor system and deliver part of the final separated FT effluent gas stream as fuel gas to the synthesis gas generation system 1 as stream 97 without the need for further compression. The ratio of $H_2$ to CO in the compressor discharge stream 61 is 1.125. This ratio is increased to 1.8 by the addition of pure $H_2$ steam 109 giving stream 115. The remaining $H_2$ stream 116 is consumed in the wax hydro-treating reactors which reduce the hydrocarbon chain lengths to produce valuable middle distillate products such as diesel and jet fuel. Stream 115 is heated in heat exchanger 62 against the gas stream 69 at 220° C. which has been separated from liquid wax stream 118 in separator 68. The outlet stream 63 is further heated in the steam heater 64 giving an outlet stream 65 at 200° C. which enters the top of the third stage FT reactor 66. The liquid wax and unconverted gas leaving the bottom of each tube exits the reactor vessel 66 in line 67 and is separated in 68 into a liquid wax product 118 and an overhead FT effluent stream 69. The effluent stream 69 is cooled in heat exchanger 62 giving exit stream 70 and cooled to 30° C. in the ambient cooler 71 giving an exit stream 72 at 55 bar pressure. A water plus naphtha liquid stream 74 is separated from the overhead effluent gas stream 75 which is then passed through a scrub column system 76 where it is contacted with cooled diesel liquid stream 77 at a temperature of 5° C. liquid to remove naphtha and LPG which can be separated from the diesel in a regeneration column giving separate naphtha and LPG products 78 and 79. The overhead stream 11 is the final gaseous product from the FT system. It divides into two parts. The first stream 97 becomes part of the total hydrocarbon and $CO_2$ feed to the syn-gas generation system item 1. The second part stream 96 becomes part of the gas turbine fuel stream 101. The split is fixed by the need to vent inert nitrogen and argon from the system. These two components are derived from the oxygen feed to the ATR and the fresh natural gas feed. The proportion of flow diverted to the gas turbine in this case has resulted in a build-up of $N_2+A$ in the stream 103 to 2% molar dry basis. Each of the FT reactor vessels in stage 1, 2 and 3 have shell sides filled with boiling water producing steam at 15 bar pressure. The steam production absorbs the exothermic heat of the FT reactions. The steam generation is arranged with a steam drum 80 placed physically at approximately the same elevation as the top of the catalyst filled tubes in the reactor vessels. The system operates with fresh boiler feed-water stream 120 which has been pre-heated to 190° C. in the syn-gas generation heat exchangers which are part of item 1, entering the steam drum 80. A water level is established in 80 to ensure that the catalyst filled portion of the tubes is completely submerged. Water from 80 flows in lines 84, 49 and 83 tA syn-gaso the base of each of the FT reactor vessels, entering the shell side, just above the lower tube sheet. Steam and entrained water flows out from the top of each shell side area in lines 81, 48 and 82 with connections located just below the upper tube FT reactor vessel sheets. The circulation in the system is by thermo-siphon with no circulation pumps in the system. Note that a guard adsorption bed will be placed in each of the FT reactor inlet lines 21, 46 and 65 to remove any trace impurities in the feed streams derived from up-stream process equipment. The liquid wax streams 24, 53 and 118 together with the separated water plus naphtha streams are processed to separate net produced water for purification and to separate hydrocarbons for further treatment and separation.

A number of embodiments of the implementation have been described. Nevertheless, it will be understood that various modifications may be made without departing from the spirit and scope of the implementation. Accordingly, other embodiments are within the scope of the following claims.

What is claimed is:
1. An integrated system for the production of hydrocarbons, comprising:
a POX in which hydrocarbon fuel gas is partially oxidized in the presence of oxygen gas to produce a first intermediate synthesis gas product;
a GHR in combination with the POX in which hydrocarbon fuel gas is reformed with steam to produce a second intermediate synthesis gas product which is combined with the first intermediate synthesis gas product to form a synthesis gas product stream;

a gas turbine in which an oxidant gas is compressed to produce compressed oxidant gas, a combustion fuel gas is combusted in the presence of at least a portion of said compressed oxidant gas to produce combustion product gas and said combustion product gas is expanded to produce power and expanded combustion product gas;

heat exchanger for heating a first steam stream against a stream of expanded combustion product gas to produce a heated first steam stream;

a first conduit for supplying the stream of expanded combustion product gas from the expanding means to the heat exchanger;

a second conduit for supplying at least a portion of the heated first steam stream from the heat exchanger for heating the first steam stream to the synthesis gas generation system;

an air separation unit ("ASU");

a first circuit for transferring at least a portion of the power produced by the gas turbine to the ASU;

an electric generator;

a second circuit for transferring at least a second portion of the power produced by the gas turbine to the electric generator; and a Fisher-Tropsch catalytic reactor process with more than one stage of reaction and product liquid hydrocarbon separation including the removal of at least a portion of the $CO_2$ present in the separated off-gas from the first stage or second stage using a $CO_2$ separation process.

2. The system of claim 1, wherein Fisher-Tropsch catalytic reactor process used is an absorption process using a chemical or physical solvent for the removal of $CO_2$ from the gas stream and its production as a substantially pure $CO_2$ product.

3. The system of claim 1, wherein at least a portion of the separated $CO_2$ is recycled to the $H_2$+CO production system and used as part of the feed streams converted to $H_2$+CO.

4. The system of claim 1, wherein at least a portion of the separated $CO_2$ is delivered from the plant as a substantially pure product.

5. The system of claim 1, wherein the quantity of $CO_2$ removed leaves a residual quantity of $CO_2$ in the gas stream which results in the ratio of $CO_2$ to $(H_2+CO+CO_2)$ in the feed gas to the final FT reaction stage being less than 18% molar.

6. The system of claim 1, wherein the separated off-gas from an FT stage is compressed to maintain a $H_2$+CO partial pressure in the range 20 bar to 40 bar and also to achieve a sufficiently high pressure to return a portion of the separated off-gas from the final FT stage to the inlet to the $H_2$+CO generation system without the need for any additional compression.

7. The system of claim 1, wherein a portion of the pure hydrogen present in the feed gas is separated from the H2+CO feed gas prior to the first stage Fischer-Tropsch reactor.

8. The system of claim 7, wherein the H2 to CO ratio to each reactor stage in the Fischer-Tropsch system has an H2 to CO ratio in the range 1.5 to 2.0.

9. The system of claim 7, wherein the separated hydrogen is used to add hydrogen to the separated gas leaving a Fischer-Tropsch reactor product separator in order to establish an H2 to CO ratio in the range 1.5 to 2.0 in the feed H2+CO gas entering the next Fischer-Tropsch reactor.

10. The system of claim 7, wherein the hydrogen is separated from the H2+CO feed gas to the Fischer-Tropsch system using a multi-bed pressure swing adsorption unit.

11. The system of claim 10, wherein the waste gas from the pressure swing adsorber is compressed to the feed H2+CO pressure and mixed with the H2+CO feed to the first Fischer-Tropsch reactor stage.

12. The system of claim 1, wherein the total feed gas streams to all the stages of the Fischer-Tropsch reactor system have an overall H2 to CO ratio which is in the range 2.0 to 2.3.

* * * * *